(12) United States Patent
Marchildon

(10) Patent No.: US 7,188,451 B2
(45) Date of Patent: Mar. 13, 2007

(54) PLANT GROWING MACHINE

(75) Inventor: Ted Marchildon, #10 - 954 S. W. Marine Drive, Vancouver, British Columbia (CA) V6P 5Z2

(73) Assignees: Ted Marchildon, Vancouver (CA); Betty Storey, Vancouver (CA)

( * ) Notice: Subject to any disclaimer, the term of this patent is extended or adjusted under 35 U.S.C. 154(b) by 0 days.

(21) Appl. No.: 10/642,293

(22) Filed: Aug. 18, 2003

(65) Prior Publication Data
US 2005/0039396 A1 Feb. 24, 2005

(51) Int. Cl.
*A01G 31/06* (2006.01)
*A01G 31/00* (2006.01)

(52) U.S. Cl. ............................ 47/59 R; 47/62 R
(58) Field of Classification Search .................. 47/60, 47/61, 62 R, 63, 85–87
See application file for complete search history.

(56) References Cited

U.S. PATENT DOCUMENTS

| | | | | |
|---|---|---|---|---|
| 3,909,978 | A | * | 10/1975 | Fleming .................. 47/82 |
| 5,097,627 | A | * | 3/1992 | Roberts .................. 47/65 |
| 5,515,648 | A | * | 5/1996 | Sparkes .................. 47/65 |
| 6,604,321 | B2 | | 8/2003 | Marchildon |

FOREIGN PATENT DOCUMENTS

| | | |
|---|---|---|
| CA | 2343254 | 7/2001 |
| CA | 2396317 | 11/2002 |
| CA | 2401737 | 12/2002 |
| CA | 2460465 | 9/2004 |
| JP | 07289104 A * | 11/1995 |
| JP | 2001128571 A * | 5/2001 |
| JP | 2001178289 A * | 7/2001 |

OTHER PUBLICATIONS

Advertisement of Revolution Hydroponics (published 2000).
Written Opinion of the International Searching Authority dated Jan. 7, 2005.

* cited by examiner

*Primary Examiner*—Son T. Nguyen
(74) *Attorney, Agent, or Firm*—Oyen Wiggs Green & Mutala LLP

(57) ABSTRACT

A rotary hydroponic plant-growing machine comprising a cylindrical structure for holding plant-growing containers, a base for rotatably supporting the cylindrical structure, means for rotating the cylindrical structure on the base, a light inside the cylindrical structure and means for watering the plants in the containers as the cylindrical structure rotates. The cylindrical structure comprises a circumferential surface which defines a plurality of longitudinal slots adapted to receive one or more of the containers, and longitudinal channels adjacent to the longitudinal slots adapted to slidingly engage an outwardly-extending flange on the container and hold the container in the slot.

15 Claims, 7 Drawing Sheets

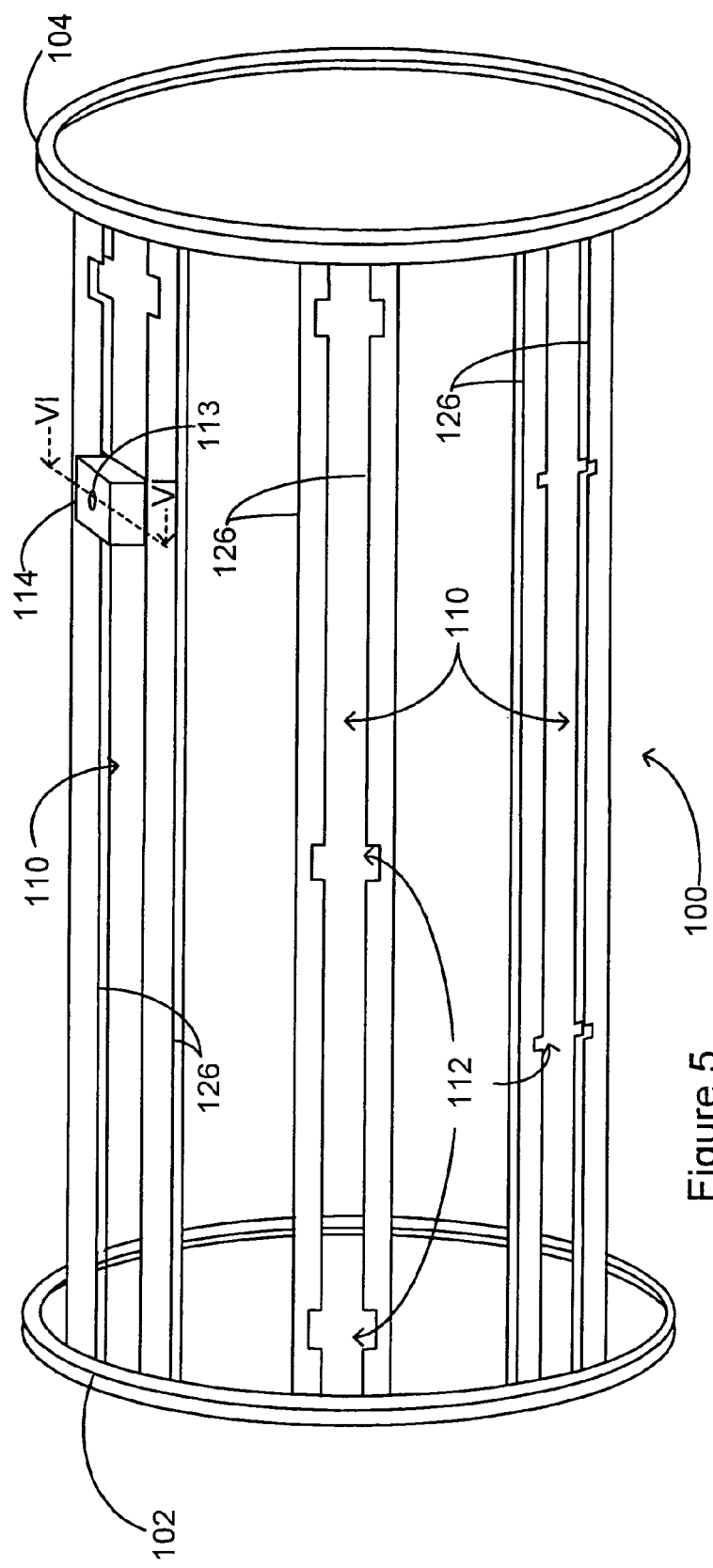
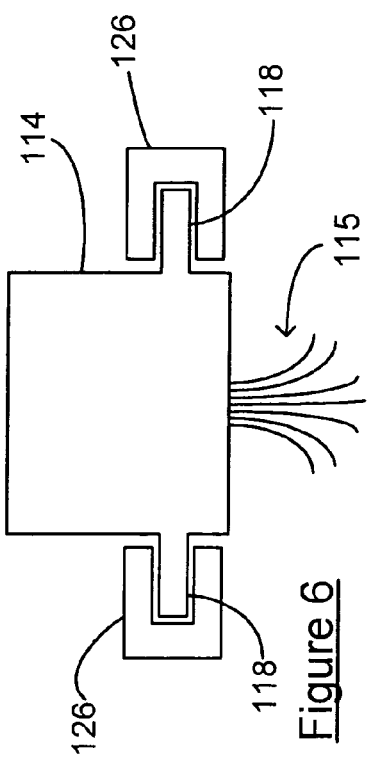

PLANT GROWING MACHINE

TECHNICAL FIELD

The invention relates to a plant growing machine and, in particular, to a machine for growing plants in a drum which holds planting containers and rotates about a light source.

BACKGROUND

When plants are grown in a flat bed under a lamp, the plants are at varying distances from the lamp. Greater efficiency in the use of the light is obtained where all the plants being illuminated by a given light source are equidistant from it, reducing the number of lights needed for each productive square unit of growing area. This can be achieved by means of a rotary growing apparatus in which the plants are rotated about a light source at the axis of rotation.

Canadian Patent No. 2,343,254 (Marchildon) discloses a rotary plant growing apparatus with an open-ended cylindrical drum which rotates about a horizontal axis on a support stand. A lamp is positioned at the axis of the drum. Holes in the drum hold plant pots, with the plants facing the light and the bottom of the pots extending radially outward from the drum. A tray under the drum holds a pool of water and is spaced from the drum such that the lower part of the pots contacts the water as the drum rotates, watering the plants.

Canadian published patent applications No. 2,396,317 and No. 2,401,737 (Poirier et al.) disclose a rotary growing apparatus which comprises a cylindrical structure or drum provided with a series of parallel elongated, longitudinally extending baskets for holding plants. A support base is provided for the drum, and a drive mechanism rotates the drum on the support base about the drum's rotational axis. A light source is positioned inside the drum. A feeding system provides nutrient fluid to the growing plants as the drum rotates and the baskets contact the nutrient fluid. The elongated baskets define in the bottom and side walls thereof a plurality of apertures for allowing the nutrient fluid to access the plants. The elongated baskets are removably attached to a pair of parallel and opposed rims of the drum by means of tubular members with resilient attachment pins at the ends thereof.

There exists a need for a plant growing machine with a simple and efficient means for removeably securing plant-growing containers thereto.

SUMMARY OF INVENTION

One embodiment of the invention provides a rotary hydroponic plant-growing machine comprising a cylindrical structure for holding plant-growing containers, a base for rotatably supporting the cylindrical structure, means for rotating the cylindrical structure on the base, a light inside the cylindrical structure and means for watering the plants in the containers as the cylindrical structure rotates, characterized in that the cylindrical structure comprises a circumferential surface which defines a plurality of longitudinal slots adapted to receive one or more of the containers, and longitudinal channels adjacent to the longitudinal slots adapted to slidingly engage an outwardly-extending flange on the container and hold the container in the slot.

Another embodiment of the invention provides a rotary hydroponic plant-growing machine comprising a cylindrical structure for holding plant-growing containers, a base for rotatably supporting the cylindrical structure, means for rotating the cylindrical structure on the base, a light inside the cylindrical structure and means for watering the plants in the containers as the cylindrical structure rotates, characterized in that the cylindrical structure comprises a circumferential surface which defines a plurality of longitudinal slots adapted to receive one or more of the containers, edges of the circumferential surface adjacent to said longitudinal slot being adapted to slidingly engage between a pair of outwardly-extending flanges on the container and hold the container in the slot.

Another embodiment of the invention provides a rotary hydroponic plant-growing machine comprising a cylindrical structure for holding plant-growing containers, a base for rotatably supporting the cylindrical structure, means for rotating the cylindrical structure on the base, a light inside the cylindrical structure and means for watering the plants in the containers as the cylindrical structure rotates, characterized in that the cylindrical structure comprises an end member at each longitudinal end thereof and a plurality of pairs of C-shaped channels extending between the end members, each pair of C-shaped channels being configured to slidingly engage an outwardly-extending flange on the containers and hold the containers therebetween.

Another embodiment of the invention provides a rotary hydroponic plant-growing machine comprising a cylindrical structure for holding plant-growing containers, a base for rotatably supporting the cylindrical structure, means for rotating the cylindrical structure on the base, a light inside the cylindrical structure and means for watering the plants in the containers as the cylindrical structure rotates, characterized in that the cylindrical structure comprises a circumferential surface which defines a plurality of longitudinal slots adapted to receive one or more of the containers, and longitudinal channels adjacent to said longitudinal the adapted to slidingly engage a pair of outwardly-extending tabs on each of two opposite sides of the container and hold the container in the slot.

BRIEF DESCRIPTION OF DRAWINGS

In drawings which illustrate non-limiting embodiments of the invention:

FIG. 5 is an isometric view of a cylindrical structure for a rotary plant growing apparatus according to another embodiment of the invention.

FIG. 6 is a sectional view taken along line VI—VI of FIG. 5 of a portion of the cylindrical structure of FIG. 5 holding a container.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
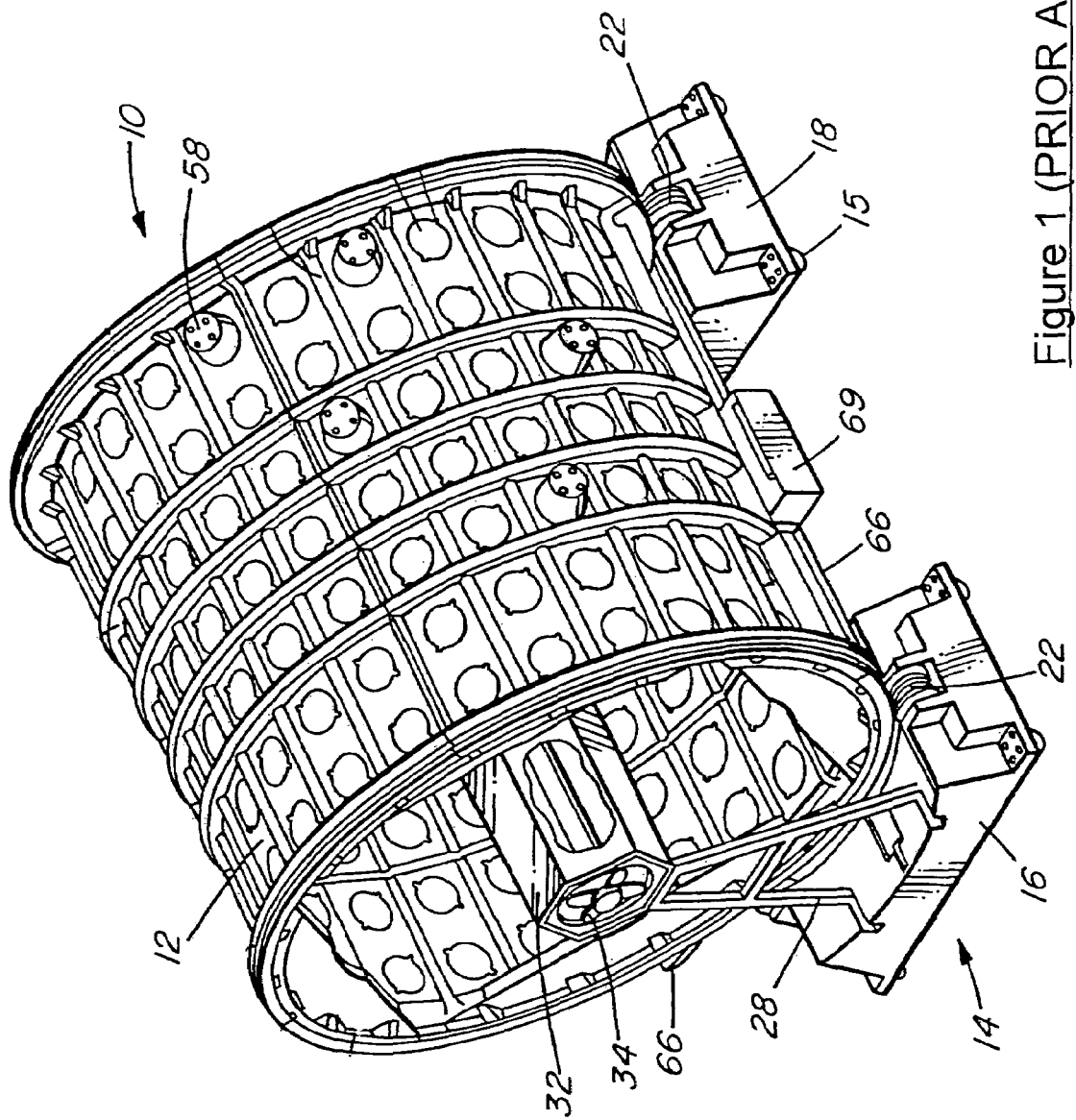
FIG. 1 is a top perspective view of a prior art rotary plant growing apparatus.
Figure 2:
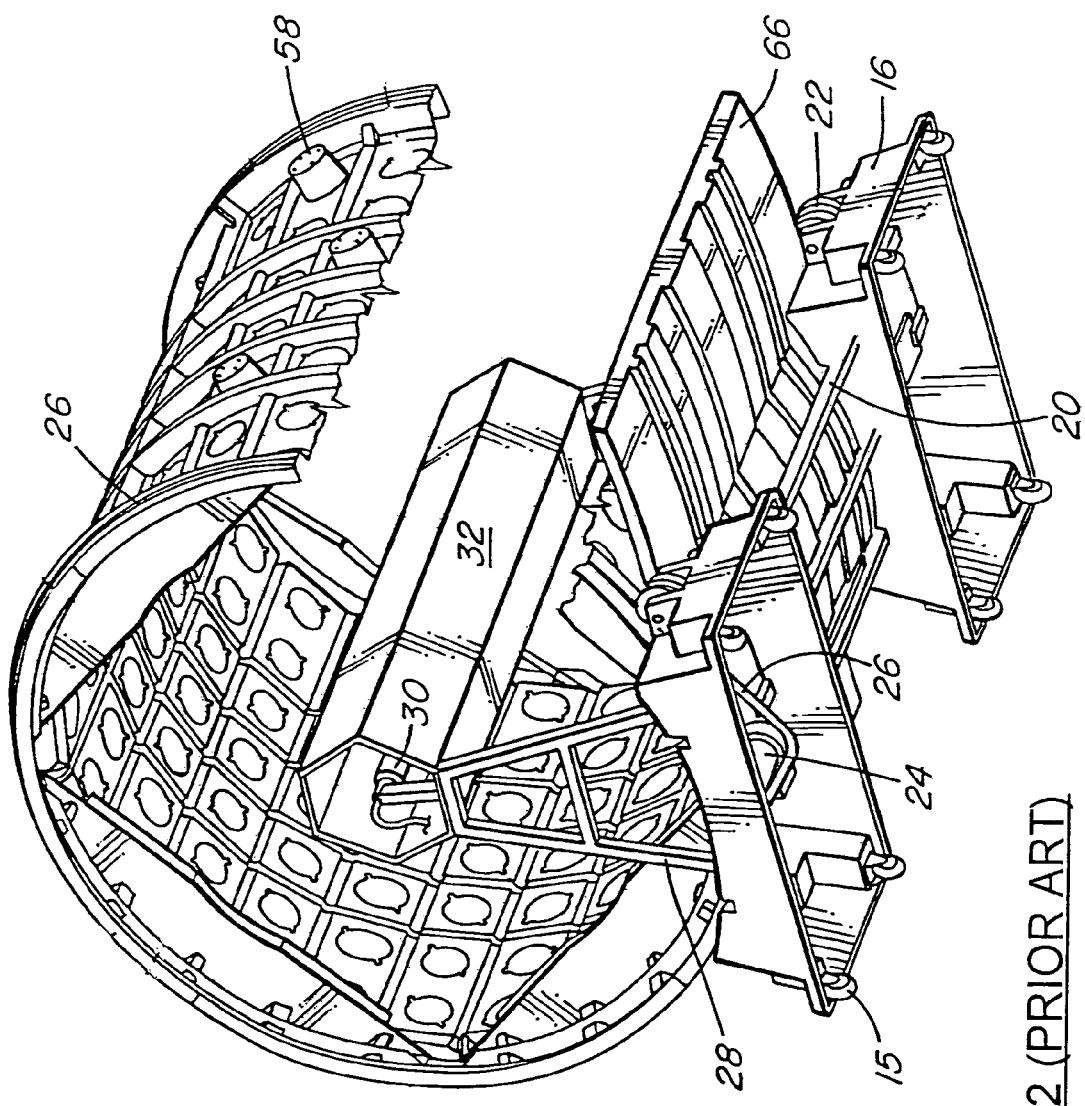
FIG. 2 is a partly cutaway, bottom perspective view of the prior art apparatus of FIG. 1 from the diagonally opposite corner.

Referring to FIGS. 1 and 2, prior art plant growing apparatus 10 has an open-ended cylindrical drum 12, shown partly cutaway in FIG. 2, which rotates in a substantially horizontal orientation on support stand 14. Stand 14 has two sections 16, 18 which are substantially the same in structure and are connected together by members 20. Each section 16, 18 has two drum support wheels 22 mounted for rotation about a horizontal axis to rotatably support drum 12. Section 18 of the support stand 14 includes an electric motor 24 mounted thereon to rotate drum 12. Motor 24 turns drive belt 26 which extends around the periphery of drum 12, as described below, to rotate the drum. Support stand 14 is supported on casters 15 to facilitate movement of the growing apparatus 10.

Lamp supports 28 are affixed to each end of the support stand 14 and hold lamp 30 at the axis of rotation of the drum 12. A translucent tube 32, preferably hexagonal or round in cross-section and open at both ends, (shown partly cutaway in FIG. 1) is supported on lamp supports 28 around the lamp, extending the length of the drum 12. An electric fan 34 is provided at one end of the tube. Fan 34 blows air through the tube to cool the lamp 30 and the interior of the drum 12.

Stand 14 holds tray 66 under drum 12. Tray 66 is configured to hold water under drum 12 and catch drips falling off of drum 12. A water-holding part of tray 66 is positioned directly under drum 12 and holds a pool of water with suitable plant nutrients, fed by a reservoir or other external source. The level of water is controlled by a float valve (not shown) in pan 69. Tray 66 is spaced from the drum 12 such that the pots 58 move freely past the tray as the drum rotates, but the lower part of each pot is immersed in the pool of water, providing water and nutrients to the plants in pots 58 through openings in the bottom of the pots.

Figure 3:
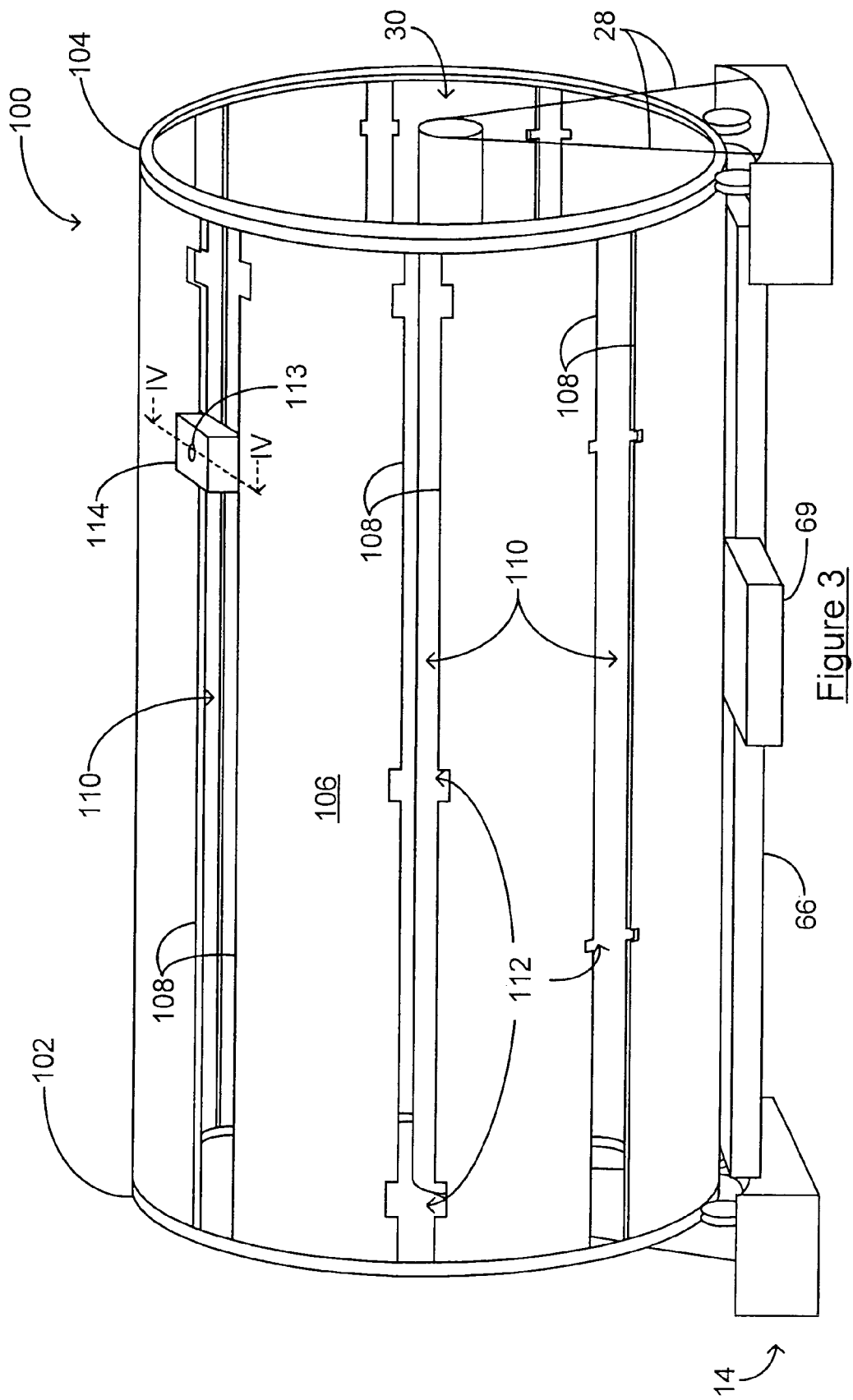
FIG. 3 is an isometric view of a cylindrical structure for a rotary plant growing apparatus according to one embodiment of the invention.

FIG. 3 illustrates a cylindrical structure 100, which replaces drum 12 of the prior art apparatus in one embodiment of the invention. Cylindrical structure 100 comprises rims 102, 104, configured to be rotatably supported on support wheels 22 of stand 14. Rims 102, 104 are connected by means of circumferential surface 106. Circumferential surface comprises edges 108 which define a plurality of longitudinal slots 110 therein. Each slot 110 has at least one enlarged portion or opening 112 to allow plant-growing containers 114 to be slidably inserted into slot 110, as described below.

Each container 114 is configured to hold a plant 115, as shown in FIGS. 4(a) to (d) and 6. While the drawings show rectangular containers 114 for ease of illustration, it is to be understood that containers 114 need not be rectangular. Each container 114 has an opening (not shown) for plant 115 to grow out of, and at least one opening 113 for allowing plant 115 to soak up water and/or nutrients from tray 66.

Figure 4A:
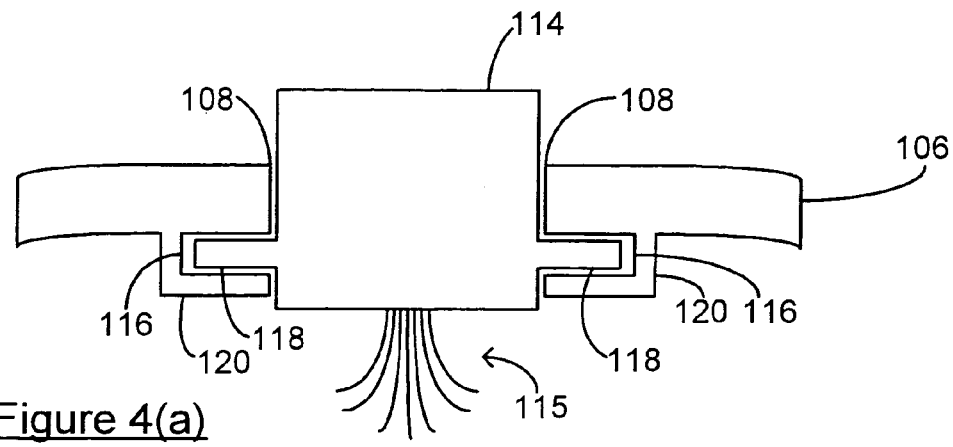
FIG. 4(a) is a sectional view taken along line IV—IV of FIG. 3 of a portion of a cylindrical structure holding a container according to one embodiment of the invention.
Figure 4B:
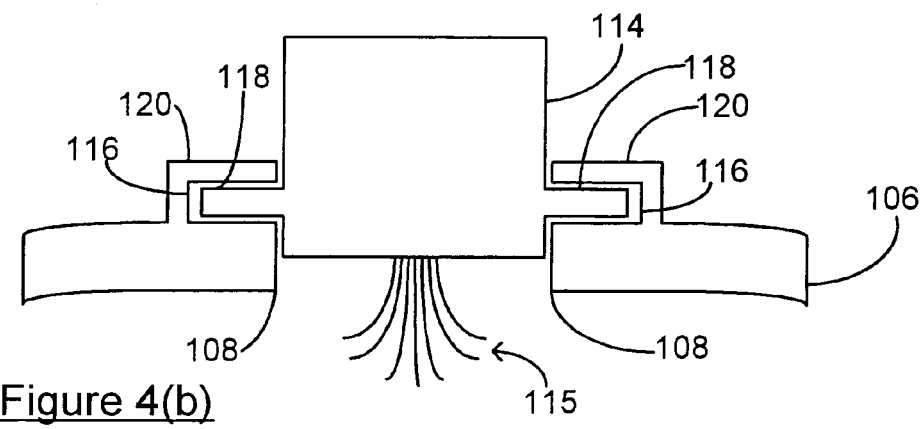
FIG. 4(b) is a sectional view taken along line IV—IV of FIG. 3 of a portion of a cylindrical structure holding a container according to another embodiment of the invention.
Figure 4C:
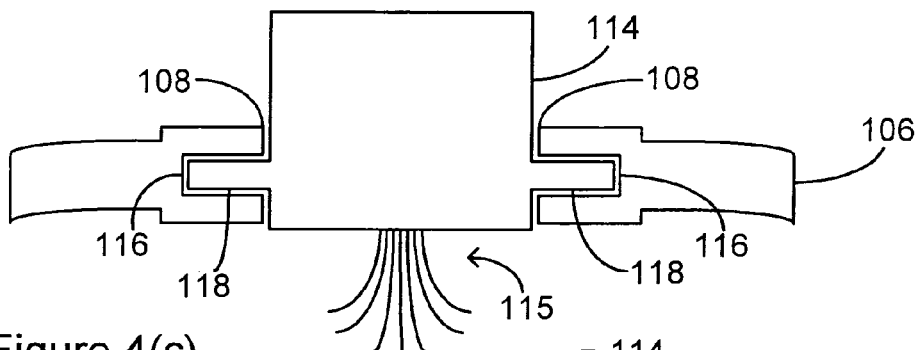
FIG. 4(c) is a sectional view taken along line IV—IV of FIG. 3 of a portion of a cylindrical structure holding a container according to another embodiment of the invention.
Figure 4D:
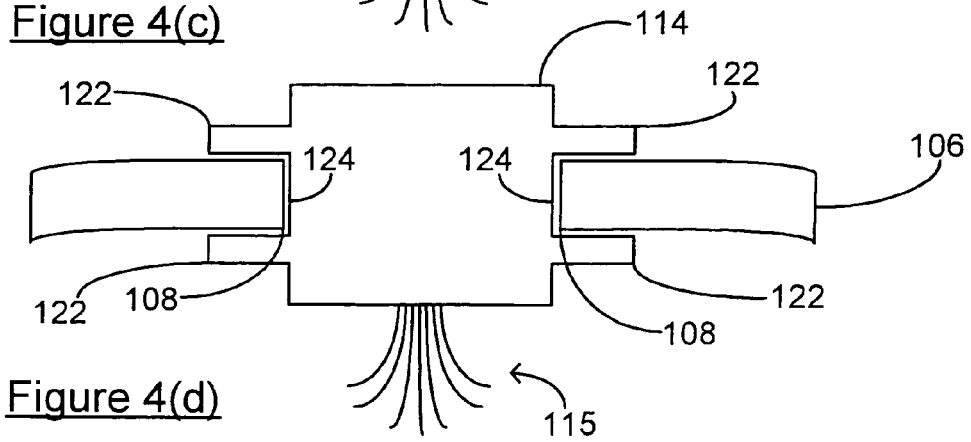
FIG. 4(d) is a sectional view taken along line IV—IV of FIG. 3 of a portion of a cylindrical structure holding a container according to another embodiment of the invention.

FIGS. 4(a) to (d) are sectional views of various embodiments of slots 110, with plant-growing containers 114 slidably inserted therein. In FIGS. 4(a) to (c), the edges 108 of circumferential surface 106 adjacent slots 110 define longitudinal channels 116, and each container 114 has an outwardly-extending flange 118 on each of two opposite sides thereof adapted to slidingly engage longitudinal channels 116. In FIG. 4(a), longitudinal channels 116 are formed by L-shaped brackets 120 attached to the inside of circumferential surface 106. In FIG. 4(b), longitudinal channels 116 are formed by L-shaped brackets 120 attached to the outside of circumferential surface 106. In FIG. 4(c) longitudinal channels 116 are formed directly in edges 108. FIG. 4(d) illustrates another embodiment wherein container 114 comprises a pair of outwardly-extending flanges 122 on each of two opposite sides thereof which define a recess 124. Edges 108 are slidably engaged in recess 124. As one skilled in the art will understand, there are numerous variations and combinations of the above described channels and flanges which permit containers 114 to be slidably engaged in slots 110, all of which are within the scope of the invention.

To insert a container 114 into a slot 110, a user positions outwardly-extending flanges 118 (or 122) adjacent to one of openings 112 and inserts flanges 118 (or 122) therethrough. The user then slides container 114 away from opening 112 such that flanges 118 are slidably engaged in longitudinal channels 116 (or such that recesses 124 defined by flanges 122 slidable engage edges 108). Container 114 will thus be held in slot 110.

As shown in FIGS. 3 and 5, while each slot 110 has at least one opening 112, the number and location of openings 112 may be varied without affecting the basic operation of the invention. For example, it may be desirable to provide openings 112 at a plurality of locations along slot 110, so that containers 114 may be inserted into and removed from slot 110 at a variety of locations. This arrangement would allow a user to remove a desired container 114 without having to necessarily shift all of the other containers 114 in the same slot 110.

FIG. 5 illustrates cylindrical structure 100 according to another embodiment of the invention. In the FIG. 5 embodiment, rims 102, 104 are connected by means of a plurality of pairs of C-shaped channels 126 which define slots 110. While FIG. 5 shows only channels 126 on the front-facing portion of cylindrical structure 100 for ease of illustration, it is to be understood that there are pairs of C-shaped channels 126 around the entire circumference of cylindrical structure 100. As in the FIG. 3 embodiment, each slot 110 of the FIG. 5 embodiment has at least one enlarged portion or opening 112 to allow plant-growing containers 114 to be inserted into slot 110.

FIG. 6 is a sectional view of one of the slots 110 of FIG. 5. Slot 110 is formed by a pair of C-shaped channels 126, with outwardly extending flanges 118 of container 114 slidably engaged therein, such that container 114 is held in slot 110.

Figure 7A:
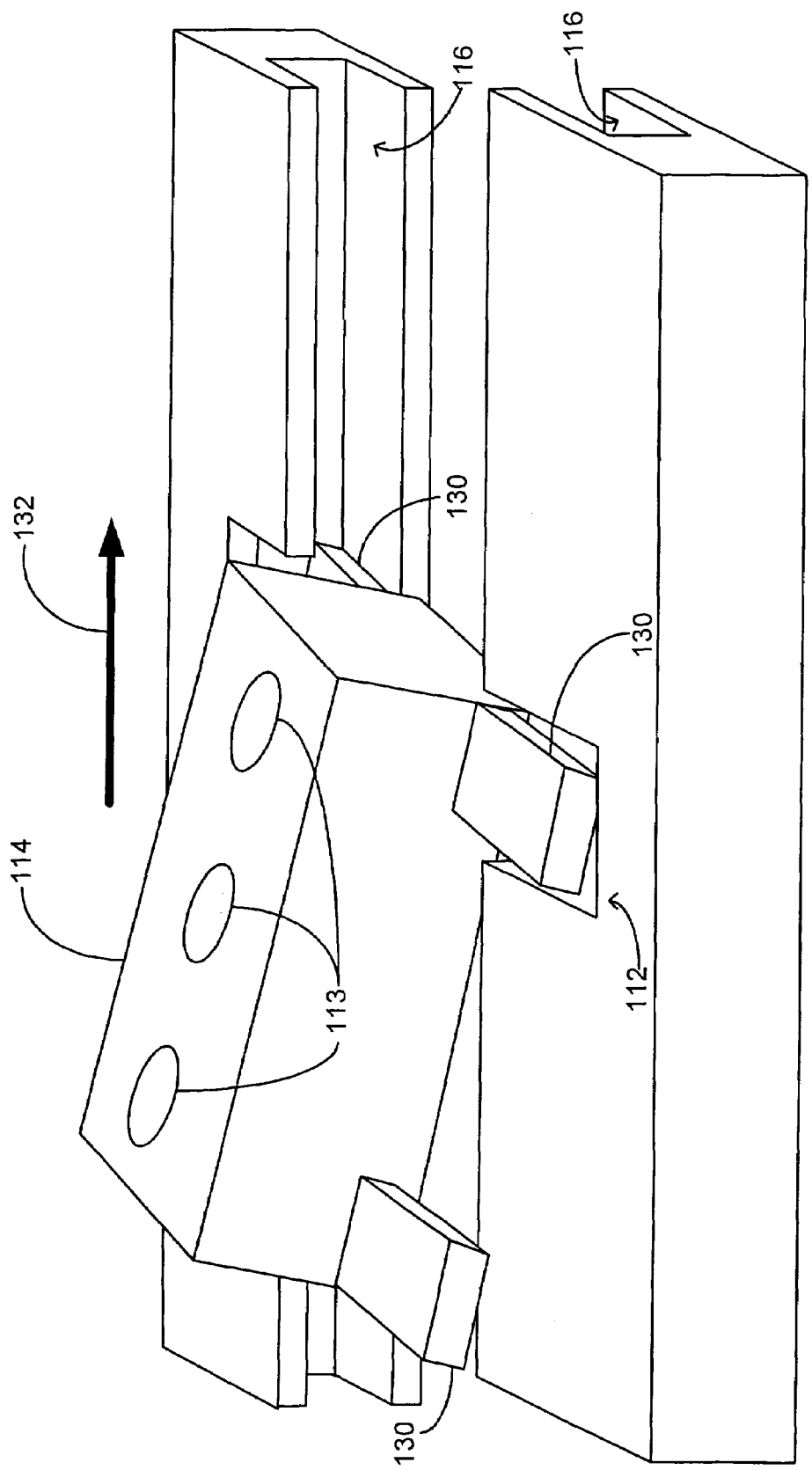
FIG. 7(a) is an isometric view of a container beginning to be inserted into a slot in a cylindrical structure according to one embodiment of the invention.
Figure 7B:
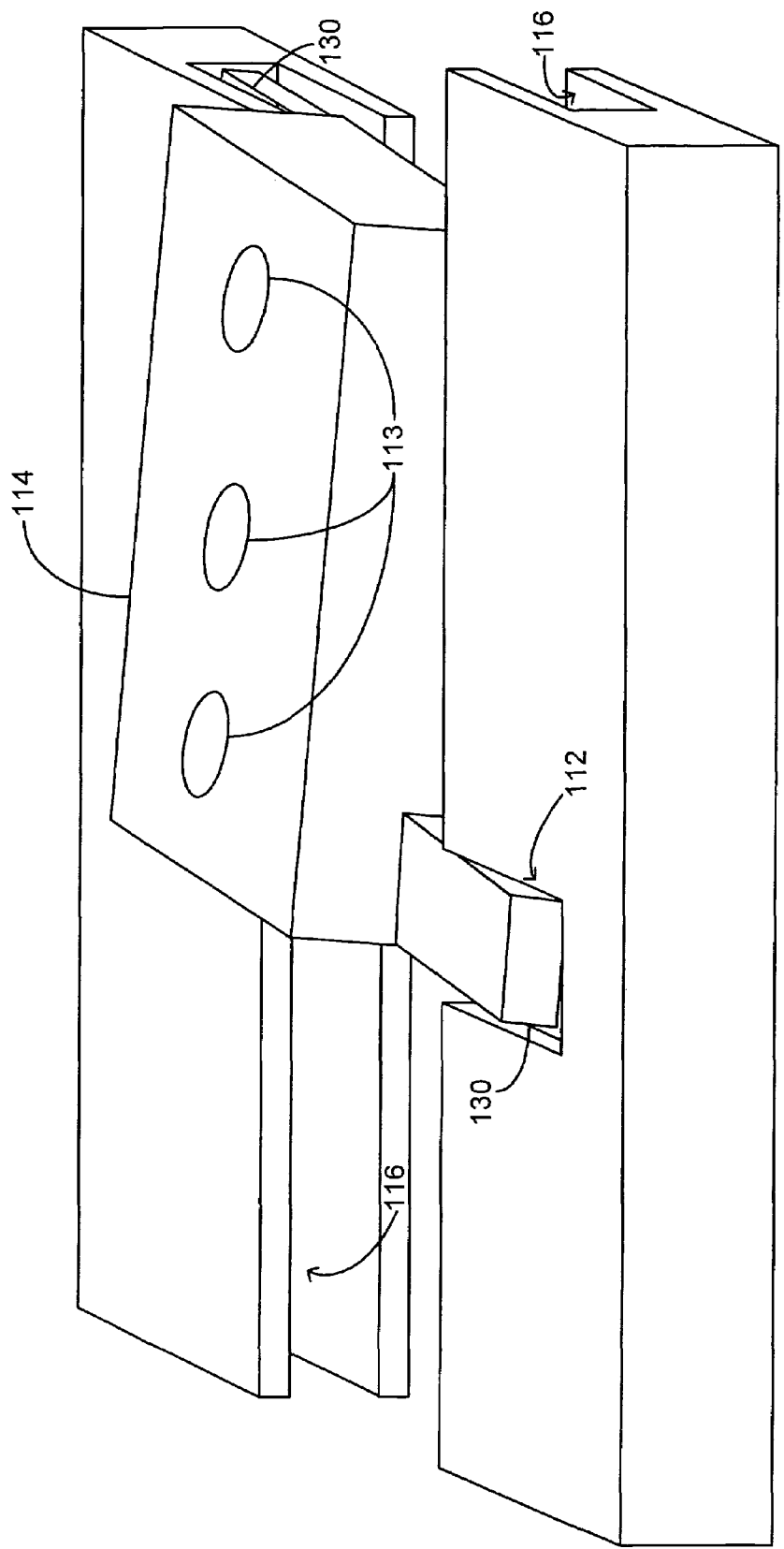
FIG. 7(b) is an isometric view of the container of FIG. 7(a) being inserted further into the slot.

FIGS. 7(a) and 7(b) illustrate an alternative embodiment of the invention. In this embodiment, container 114 has a pair of outwardly-extending tabs 130 on each of two opposite sides thereof. Tabs 130 are generally smaller-sized than flanges 118 or 122 in the previously described embodiments. Openings 112 are sized to allow tabs 130 to be slidably inserted into longitudinal channels 116. To insert container 114 into slot 110, a user positions a first opposed pair of tabs 130 adjacent to openings 112 and inserts them therethrough, as shown in FIG. 7(*a*). Once the first pair of tabs 130 is within channels 116, the user slides container 114 as indicated by arrow 132 until the second opposed pair of tabs 130 are adjacent to opening 112. The user then inserts the second pair of tabs 130 through opening 112 so that container 114 is held in slot 110.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A rotary hydroponic plant-growing machine comprising a cylindrical shell for holding plant-growing containers, such that shoots of said plants grow in said containers in a direction radially inwardly of said cylindrical shell, a base for rotatably supporting said cylindrical shell, means for rotating said cylindrical shell on said base, a light inside said cylindrical shell and means for watering said plants in said containers as said cylindrical shell rotates, characterized in that said cylindrical shell comprises a circumferential surface which defines a plurality of longitudinal slots oriented generally parallel to an axis of said cylindrical shell, said slots extending through said cylindrical shell and being open in both a radially inward direction and a radially outward direction of said cylindrical shell, said slots being configured to receive one or more of said containers and, to allow slidable movement of said containers within said slots in a direction generally parallel to said axis.

2. A rotary hydroponic plant-growing machine according to claim 1 wherein said cylindrical shell further comprises longitudinal channels adjacent to said longitudinal slots adapted to slidingly engage an outwardly-extending flange on said container and hold said container in said slot.

3. A rotary hydroponic plant-growing machine according to claim 2 wherein each of said slots defines at least one opening sized to allow said outwardly-extending flange to be inserted into and removed from sliding engagement with said longitudinal channels.

4. A rotary hydroponic plant-growing machine according to claim 2 wherein said longitudinal channels are formed by a pair of L-shaped brackets attached to an outer wall of said cylindrical shell on either side of said slots.

5. A rotary hydroponic plant-growing machine according to claim 2 wherein said longitudinal channels are formed by a pair of L-shaped brackets attached to an inner wall of said cylindrical shell on either side of said slots.

6. A rotary hydroponic plant-growing machine according to claim 2 wherein said longitudinal channels are formed in edges of said circumferential surface.

7. A rotary hydroponic plant-growing machine according to claim 2 in combination with one or more of said containers.

8. A rotary hydroponic plant-growing machine according to claim 1 wherein edges of said circumferential surface adjacent to said longitudinal slot are adapted to slidingly engage between a pair of outwardly-extending flanges on said container and hold said container in said slot.

9. A rotary hydroponic plant-growing machine according to claim 8 wherein each of said slots defines at least one opening sized to allow said outwardly-extending flanges to be inserted into and removed from sliding engagement with said edges of said circumferential surface.

10. A rotary hydroponic plant-growing machine according to claim 8 in combination with one or more of said containers.

11. A rotary hydroponic plant-growing machine according to claim 1 wherein said cylindrical shell further comprises longitudinal channels adjacent to said longitudinal slots adapted to slidingly engage a pair of outwardly-extending tabs on each of two opposite sides of said container and hold said container in said slot.

12. A rotary hydroponic plant-growing machine according to claim 11 wherein each of said slots defines at least one opening sized to allow said outwardly-extending tabs to be inserted into and removed from sliding engagement with said longitudinal channels.

13. A rotary hydroponic plant-growing machine according to claim 11 in combination with one or more of said containers.

14. A rotary hydroponic plant-growing machine according to claim 1 wherein said slots are sized to allow slidable movement of said containers in said direction generally parallel to said axis along substantially the entire length of said cylindrical shell.

15. A rotary hydroponic plant-growing machine according to claim 1 in combination with one or more of said containers, said container extending radially outwardly from said cylindrical shell through said longitudinal slot.

* * * * *